United States Patent
Ji et al.

(10) Patent No.: US 8,259,747 B2
(45) Date of Patent: Sep. 4, 2012

(54) EFFECTIVE IDLE MODE FOR ADVANCED WIRELESS SYSTEM

(75) Inventors: Baowei Ji, Plano, TX (US); Farooq Khan, Allen, TX (US); Changhoi Koo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 12/322,101

(22) Filed: Jan. 29, 2009

(65) Prior Publication Data

US 2010/0002720 A1    Jan. 7, 2010

Related U.S. Application Data

(60) Provisional application No. 61/134,172, filed on Jul. 7, 2008, provisional application No. 61/196,979, filed on Oct. 22, 2008.

(51) Int. Cl.
*H04L 12/43* (2006.01)

(52) U.S. Cl. .......................... 370/459; 370/450; 455/528

(58) Field of Classification Search .......... 370/200–253, 370/345, 498, 328–338, 459–461, 450–457; 455/422, 458–460, 528
See application file for complete search history.

(56) References Cited

U.S. PATENT DOCUMENTS

| | | | |
|---|---|---|---|
| 2004/0087320 A1* | 5/2004 | Kim et al. | 455/458 |
| 2005/0282562 A1* | 12/2005 | Lee et al. | 455/458 |
| 2006/0089161 A1* | 4/2006 | Kim et al. | 455/458 |
| 2006/0140143 A1* | 6/2006 | Bauer | 370/328 |
| 2006/0176870 A1* | 8/2006 | Joshi et al. | 370/345 |
| 2007/0259675 A1* | 11/2007 | Worrall | 455/458 |
| 2009/0181676 A1* | 7/2009 | Lee et al. | 455/436 |

FOREIGN PATENT DOCUMENTS

| | | |
|---|---|---|
| WO | WO 2007/107121 A1 | 3/2007 |
| WO | WO 2007/047751 A2 | 4/2007 |

OTHER PUBLICATIONS

International Search Report dated Feb. 23, 2010 in connection with PCT Application No. PCT/KR2009/003668.

* cited by examiner

*Primary Examiner* — Pao Sinkantarakorn
*Assistant Examiner* — Iqbal Zaidi

(57) ABSTRACT

A wireless communication network comprising a plurality of paging controllers capable of communication with a plurality of base stations within a coverage area of the network, wherein at least one of the plurality of paging controllers is capable of, if a mobile station within a paging area requests to enter idle mode, assigning a temporary paging identification to the mobile station, and transmitting the temporary paging identification to a base station in communication with the mobile station, wherein the temporary paging identification is used by the base station to determine an index of a paging opportunity or frame in a paging cycle to transmit a paging message for the mobile station.

43 Claims, 7 Drawing Sheets

EFFECTIVE IDLE MODE FOR ADVANCED WIRELESS SYSTEM

CROSS-REFERENCE TO RELATED APPLICATION(S) AND CLAIM OF PRIORITY

The present application is related to U.S. Provisional Patent No. 61/134,172, filed Jul. 7, 2008, entitled "EFFECTIVE IDLE MODE FOR ADVANCED WIRELESS SYSTEMS". Provisional Patent No. 61/134,172 is assigned to the assignee of the present application and is hereby incorporated by reference into the present application as if fully set forth herein. The present application hereby claims priority under 35 U.S.C. §119(e) to U.S. Provisional Patent No. 61/134,172.

The present application also is related to U.S. Provisional Patent No. 61/196,979, filed Oct. 22, 2008, entitled "EFFECTIVE IDLE MODE FOR ADVANCED WIRELESS SYSTEMS". Provisional Patent No. 61/196,979 is assigned to the assignee of the present application and is hereby incorporated by reference into the present application as if fully set forth herein. The present application hereby claims priority under 35 U.S.C. §119(e) to U.S. Provisional Patent No. 61/196,979.

TECHNICAL FIELD OF THE INVENTION

The present application relates generally to wireless communications and, more specifically, to an enhanced idle mode design.

BACKGROUND OF THE INVENTION

The operation of idle mode is described in IEEE 802.16e. Either a mobile station (MS) or a base station (BS) could initiate the idle mode operation using DREG-REQ and DREG-CMD messages, respectively. After an MS has entered the idle mode, the MS uses fixed parameters for the paging cycle, paging offset, paging listening interval and paging unavailable interval. If an MS is paged, the MS re-enters the radio access network using code based ranging and RNG-REQ/RSP messages. An MS should perform a location update upon entering a new paging area.

One concern with IEEE 802.16e idle mode design is that the exact location of the paging message(s) is not pre-determined. Therefore, an MS has to remain awake during the entire paging listening interval (PLI) searching for paging message(s) (i.e., MOB_PAG-ADV( ) messages) that may include the paging group identity(s) (PGID) assigned to the MS before the MS entered idle mode.

There are several attempts to enhance the idle mode design in IEEE 802.16e.

One attempt uses a quick paging indicator. In this design, an MS first checks whether this paging indicator is positive or not. If the paging indicator is negative, the MS would not listen any further and could return to a paging unavailable interval immediately. If the paging indicator is positive, the MS would stay awake and search for paging message(s) to see if the MS is paged or not. A concern with this design is the fineness of the quick paging indicator. In other words, the quick paging indicator may not be of much help because the paging indicator would be positive most of the time if there are many MSs in idle mode because the indicator would be positive if any of those MSs needed to be paged.

Another attempt segments the paging message into several smaller messages since the MOB_PAG-ADV( ) may be of a large size if only one message is sent to all MSs in a paging cycle. In this design, each message would carry a last paging indicator (LPI) so that an MS could stop the PLI immediately if the LPI indicates there is no more paging message in this paging cycle. A yet another attempt uses a paging location indicator so that an MS does not have to search for the paging message during the entire PLI. However, both of these attempts require explicit signaling in order for the MS to know where the LPI or paging location indicator is located in the paging cycle.

Accordingly, there is a need in the art for a system and method for effectively handling idle mode in an advanced wireless system. In particular, there is a need for a system and method for handling idle mode that effectively reduce power consumption as required, for example, by IEEE 802.16m.

SUMMARY OF THE INVENTION

A wireless communication network comprising a plurality of paging controllers capable of communication with a plurality of base stations within a coverage area of the network, wherein at least one of the plurality of paging controllers is capable of, if a mobile station within a paging area requests to enter idle mode, assigning a temporary paging identification to the mobile station, and transmitting the temporary paging identification to a base station in communication with the mobile station, wherein the temporary paging identification is used by the base station to determine an index of a paging opportunity or frame in a paging cycle to transmit a paging message for the mobile station.

A paging controller capable of wireless communication with a plurality of base stations within a coverage area of a network, where the paging controller is capable of, if a mobile station within a paging area requests to enter idle mode, assigning a temporary paging identification to the mobile station, and transmitting the temporary paging identification to a base station in communication with the mobile station, wherein the temporary paging identification is used by the base station to determine an index of a paging opportunity or frame in a paging cycle to transmit a paging message for the mobile station.

A method of operating a paging controller comprising, if a mobile station within a paging area requests to enter idle mode, assigning a temporary paging identification to the mobile station, and transmitting the temporary paging identification to a base station in communication with the mobile station, wherein the temporary paging identification is used by the base station to determine an index of a paging opportunity or frame in a paging cycle to transmit a paging message for the mobile station.

A wireless communication network comprising a plurality of base stations capable of wireless communication with a plurality of subscriber stations within a coverage area of the network, wherein at least one of the plurality of base stations is capable of receiving a temporary paging identification from a paging controller, the temporary paging identification being associated with a mobile station requesting to enter idle mode, and determining an index of a paging opportunity or frame in a paging cycle to transmit a paging message for a mobile station using the temporary paging identification.

A base station capable of wireless communication with a plurality of subscriber stations within a coverage area of a network, where the base station is capable receiving a temporary paging identification from a paging controller, the temporary paging identification being associated with a mobile station requesting to enter idle mode, and determining an index of a paging opportunity or frame in a paging cycle to transmit a paging message for a mobile station using the temporary paging identification.

A method of operating a base station comprising receiving a temporary paging identification from a paging controller, the temporary paging identification being associated with a mobile station requesting to enter idle mode, and determining an index of a paging opportunity or frame in a paging cycle to transmit a paging message for a mobile station using the temporary paging identification.

A mobile station capable of determining a single index of a paging opportunity or frame in each paging cycle to monitor for a paging message, the index is based at least partly upon a temporary paging identification assigned to the mobile station, and monitoring for the paging message only in the paging opportunity or frame of the single index.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
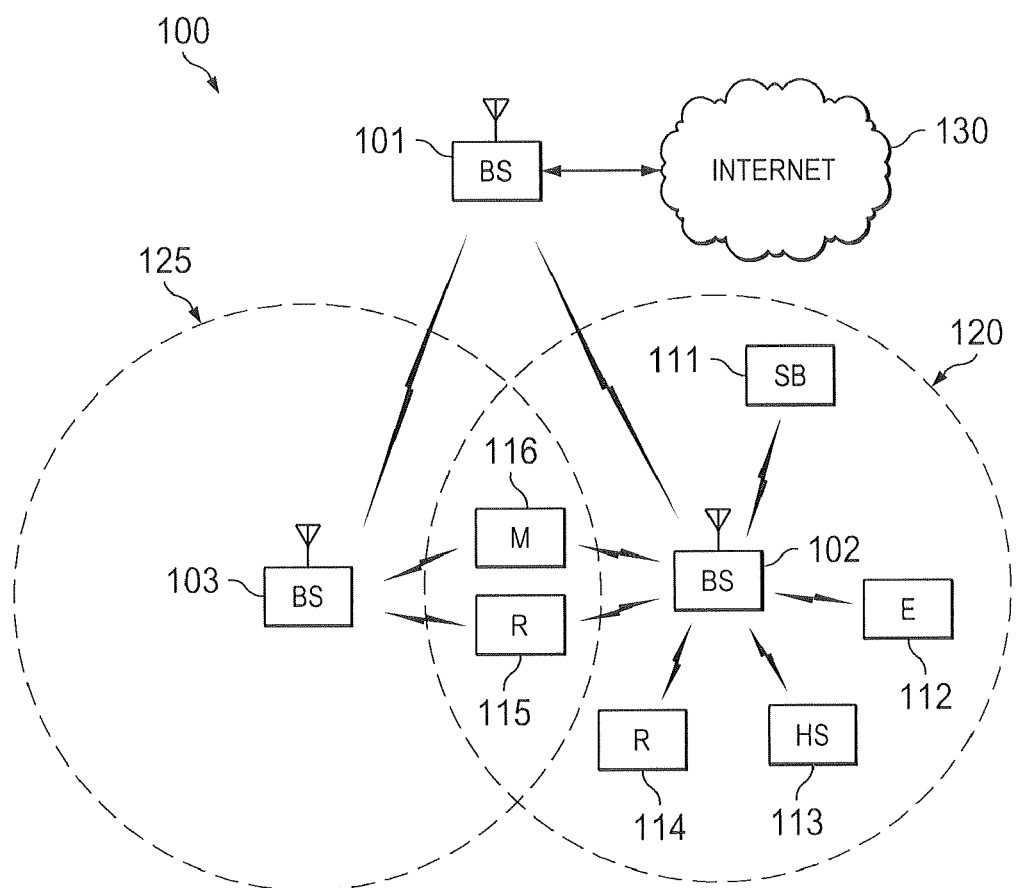
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
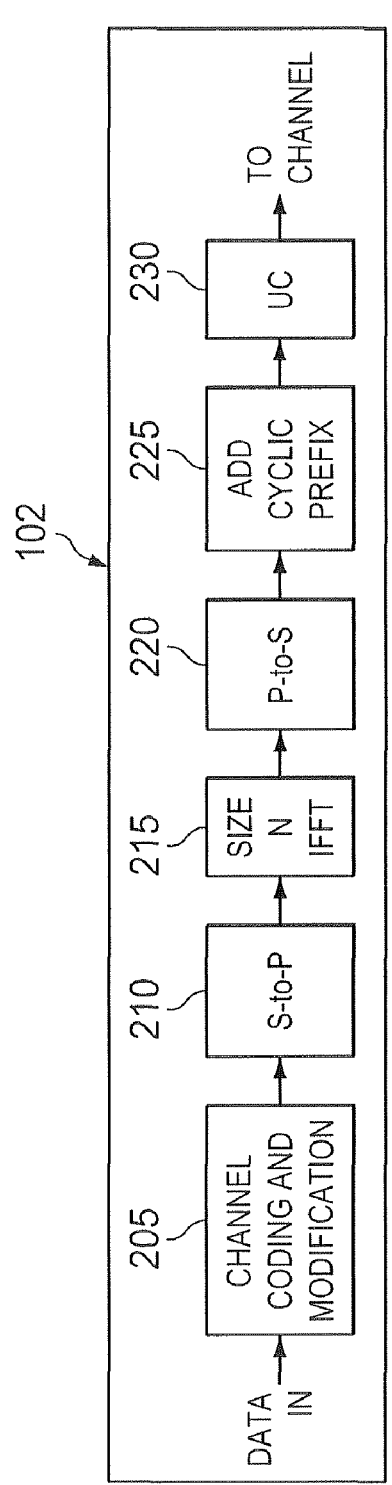
FIG. 2A is a high-level diagram of an OFDMA transmitter according to one embodiment of the present disclosure.
Figure 2B:
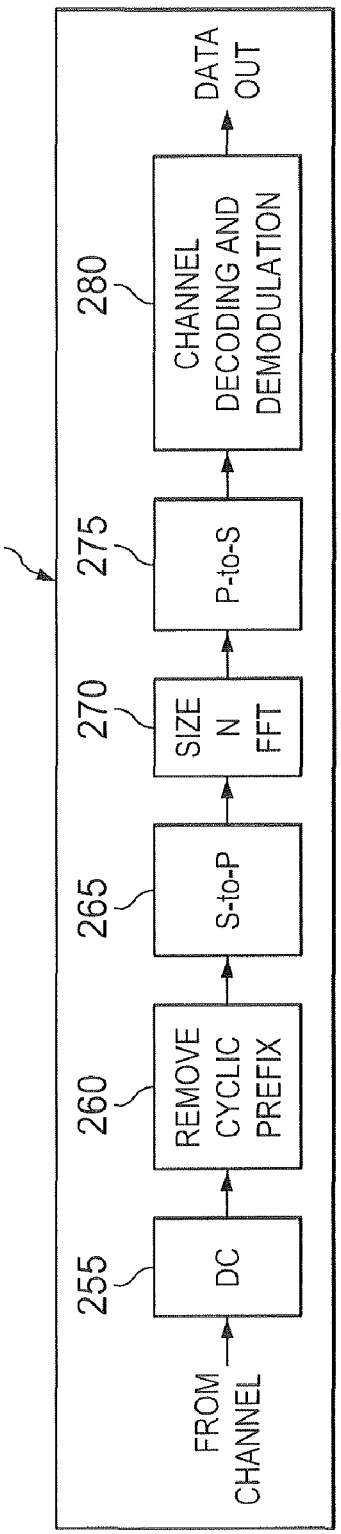
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a system and method for reducing the amount of time that a mobile station in idle mode spends monitoring a paging message.

Figure 3:
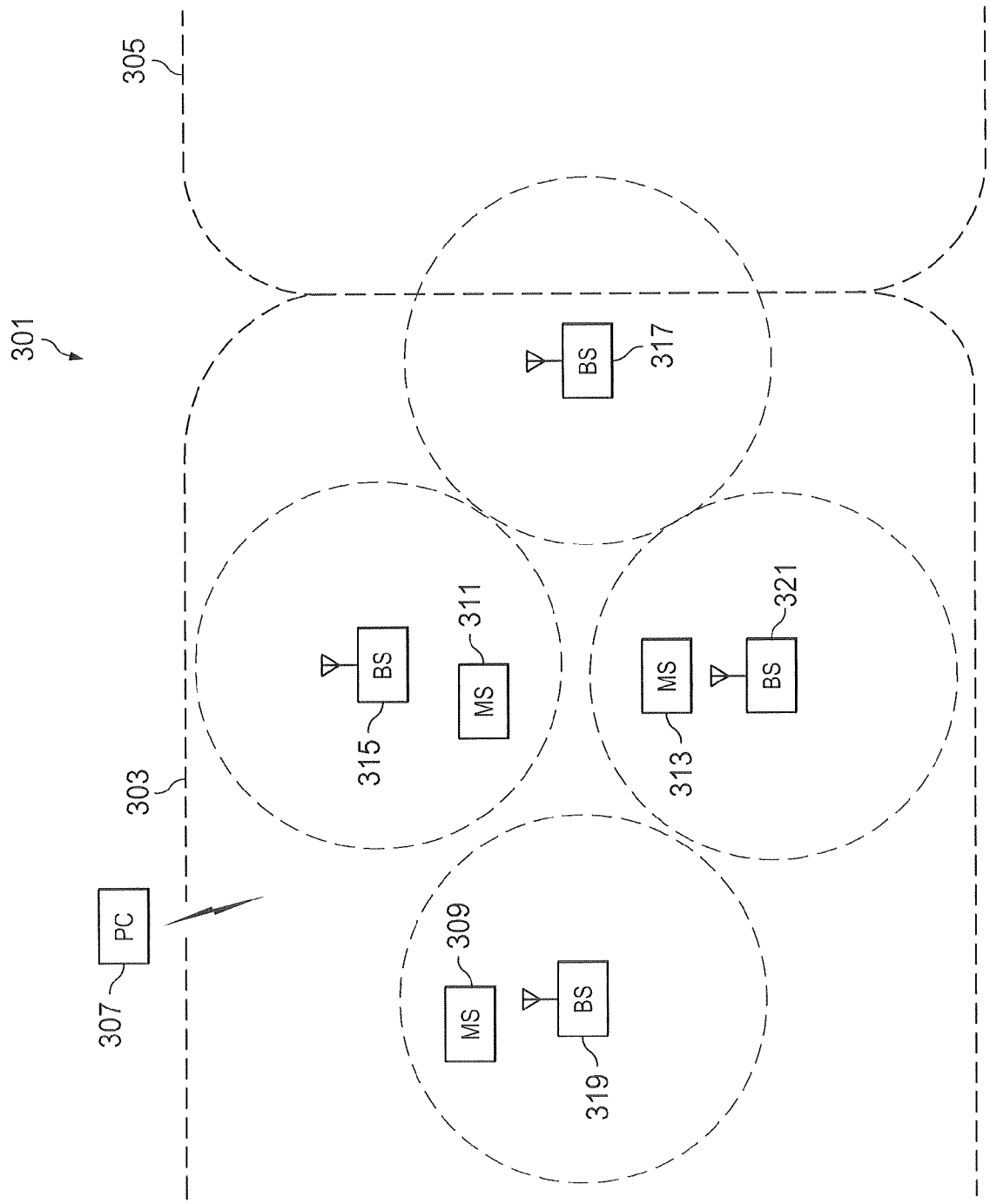
FIG. 3 illustrates the operation of a paging controller according to one embodiment of the present disclosure.

FIG. 3 illustrates the operation of a paging controller according to one embodiment of the present disclosure.

As shown in FIG. 3, a paging network 301 has a first paging area 303 and a second paging area 305. A paging controller 307 assigns a temporary paging ID (Temporary_ID) unique to each of the MSs 309-313 in the first paging area 303 as they enter idle mode. The paging controller 307 transmits paging messages to MSs 309-313 via BSs 315 to 321. The paging controller 307 transmits paging messages to MS 309-313 in the first paging area 303 using the same paging group ID (PG-ID). Each of the MS 309-313 looks for their unique Temporary_ID under the same paging group ID to determine if they are being paged.

In this embodiment, MSs 309-313 could move from one BS to another BS within the first paging area 303 (for example, from BS 315 to BS 319) without performing a location update because the same paging group ID is used by all of the BSs (i.e., BSs 315-321) in the first paging area 303. Once an MS leaves the first paging area 303 and enters, for example, the second paging area 305, the MS would detect that a different paging group ID is used in the second paging 305, which would indicate to the MS that it has left the first paging area 303 and has entered a new paging area. The new paging group ID also would indicate to the MS that the MS needs to perform a location update.

In this embodiment, the BS 317 is shown as being in both the first paging area 303 and the second paging area 305. In this case, the BS 317 would transmit the paging group IDs for both the first paging area 303 and the second paging area 305. The paging group ID for the second paging area 305 may be controlled by another paging controller or may be controlled by the paging controller 307.

Figure 4:
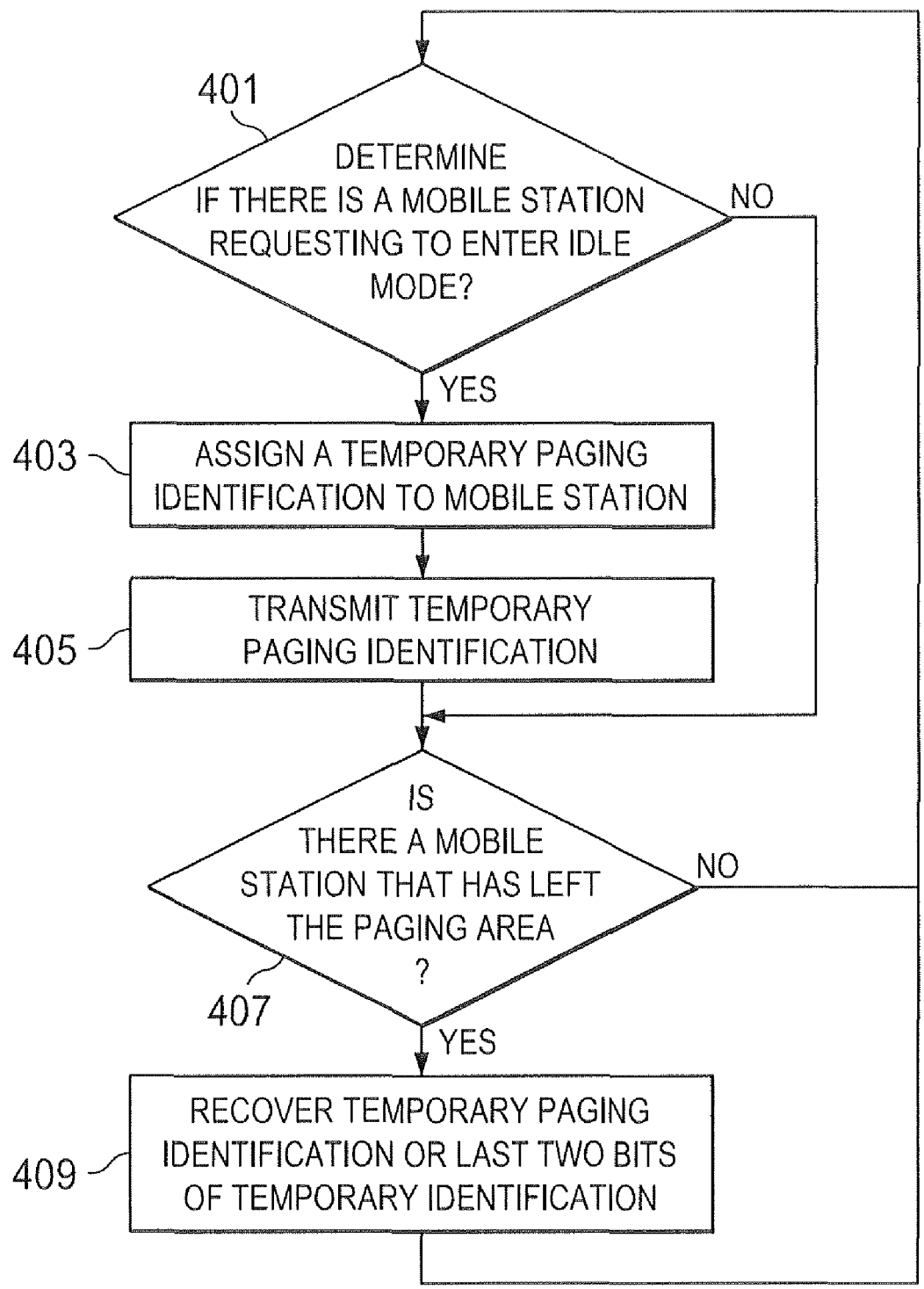
FIG. 4 is a flow chart illustrating a method for generating and utilizing a temporary paging ID according to one embodiment of the present disclosure.

FIG. 4 is a flow chart illustrating a method for generating and utilizing a temporary paging ID according to one embodiment of the present disclosure.

As shown in FIG. 4, the core network (specifically, the paging controller in a paging area) determines if there is an MS in the paging area that is requesting to enter idle mode (Block 401). If there is an MS requesting to enter idle mode in the paging area, the paging controller assigns a Temporary_ID to the MS entering idle mode in such a way that there are N paging subgroups in a paging area, and each subgroup has almost the same number of MSs in idle mode (Block 403). If there is not an MS requesting to enter idle mode in the paging area, the method proceeds to Block 407 to be described later.

The paging controller could assign the Temporary_ID to an MS requesting to enter idle mode using any method as long as each subgroup has about the same number of MSs in idle mode.

For example, assume that a paging area has 4 paging subgroups and 10,000 MS in idle mode, and that the Temporary_ID is of 24 bits.

In one embodiment, the paging controller could create subgroups of roughly equal size by assigning a first Temporary_ID 0x0000000 to the first MS requesting to enter idle mode, 0x000001 to the second MS, . . . , 0x00000A to the 11$^{th}$ MS in idle mode, and so forth. Accordingly, whenever a new Temporary_ID is needed, the paging controller increments the last Temporary_ID by one and assigns the new Temporary_ID to a new MS requesting to enter idle mode. An MS belongs to a subgroup n if its Temporary_ID modulo 4 equals to n, where n=0, 1, 2, 3 in this example. In this case, each subgroup would have exactly 2,500 MS in idle mode.

In yet another embodiment, the paging controller could create subgroups of roughly equal size by circulating among 00, 01, 10, 11 in the last two bits of the Temorary_ID, and randomly picking a value for the higher 22 bits. In this embodiment, if the entire 24-bit Temporary_ID is already assigned to an existing MS in idle mode, the paging controller would randomly pick another 22-bit value until the new Temparary_ID is unique to the paging area. Such an embodiment achieves two goals. First, each MS would have an almost random Temporary_ID, which might be desirable for hiding the identity of the MS. Second, similar to the previous method, the difference of the number of MSs in the paging subgroups would be either zero, plus one, or minus one.

The assigned Temporary_ID also could be generated from a Temporary_ID recovered from MSs that have left the paging area. For example, if there is a recovered Temporary_ID, the paging controller could simply assign the recovered Temporary_ID to the MS at Block 403. In another embodiment, if there is a recovered Temporary_ID, the paging controller could use the lower two bits of the recovered Temporary_ID and randomly pick the higher 22-bit to produce a unique pseudo-random Temporary_ID to assign to the MS at Block 403.

After creating the Temorary_ID, the paging controller assigns the Temorary_ID to the MS through the BS currently in communication with the MS (Block 405).

If the paging controller is informed that an MS has left the paging area (Block 407), in one embodiment, the paging controller could recover the Temporary_ID of that MS and assign the Temporary_ID to the next MS requesting to enter idle mode. In another embodiment, the paging controller could recover the last two bits of the Temporary_ID of the MS that has left the paging area (Block 409).

Figure 5:
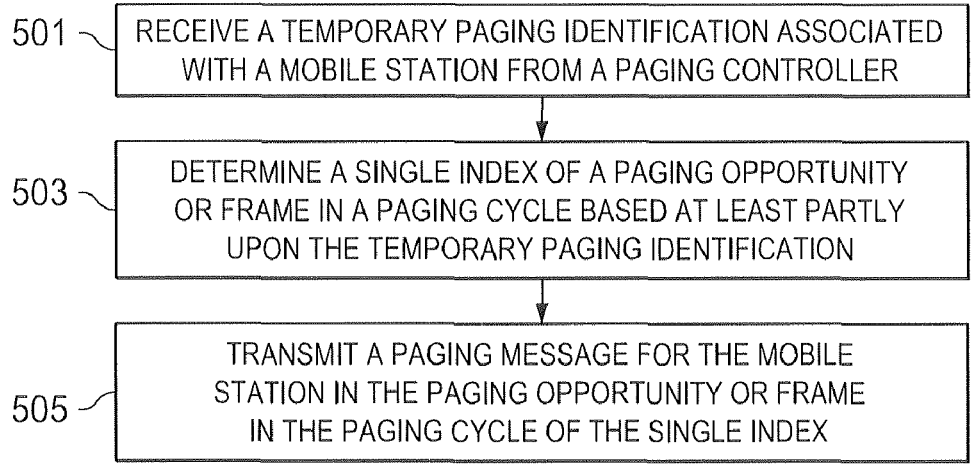
FIG. 5 is a flow chart illustrating a method of paging mobile stations in a paging area using a temporary paging ID according to one embodiment of the present disclosure.

FIG. 5 is a flow chart illustrating a method of paging mobile stations in a paging area using a temporary paging ID according to one embodiment of the present disclosure.

As shown in FIG. 5, a BS in the paging area receives a temporary paging ID associated with an MS from a paging controller (Block 501) and determines a single index of a paging opportunity or frame in each paging cycle (Block 503). The index is based at least partly upon the received temporary paging identification. The BS transmits the temporary paging ID for the MS only in the index n of the paging opportunities or frames in each paging cycle, where n=MS Temporary_ID % N (Block 505).

In this embodiment, % represents the modulo operation. The paging cycle consists of a number of superframes. The MOB_PAG-ADV( ) broadcast interval consists of N consecutive frames or paging opportunities in each paging cycle, and the integer n is in the range from 0 to N−1.

Accordingly, the number of MOB_PAG-ADV( ) messages is at most one for each frame within those N consecutive frames. Furthermore, if an MOB_PAG-ADV( ) exists in a frame, the MOB_PAG-ADV( ) is broadcasted in the first K subframes. As a result, if the BS pages an MS using a Temporary_ID, the BS sends the MOB_PAG-ADV( ) in the frame number of Temporary_ID % N. Namely, the index of the paging opportunity equals Temporary_ID % N.

This allows the BS to evenly distribute the MSs among the frames or paging opportunities.

Figure 6:
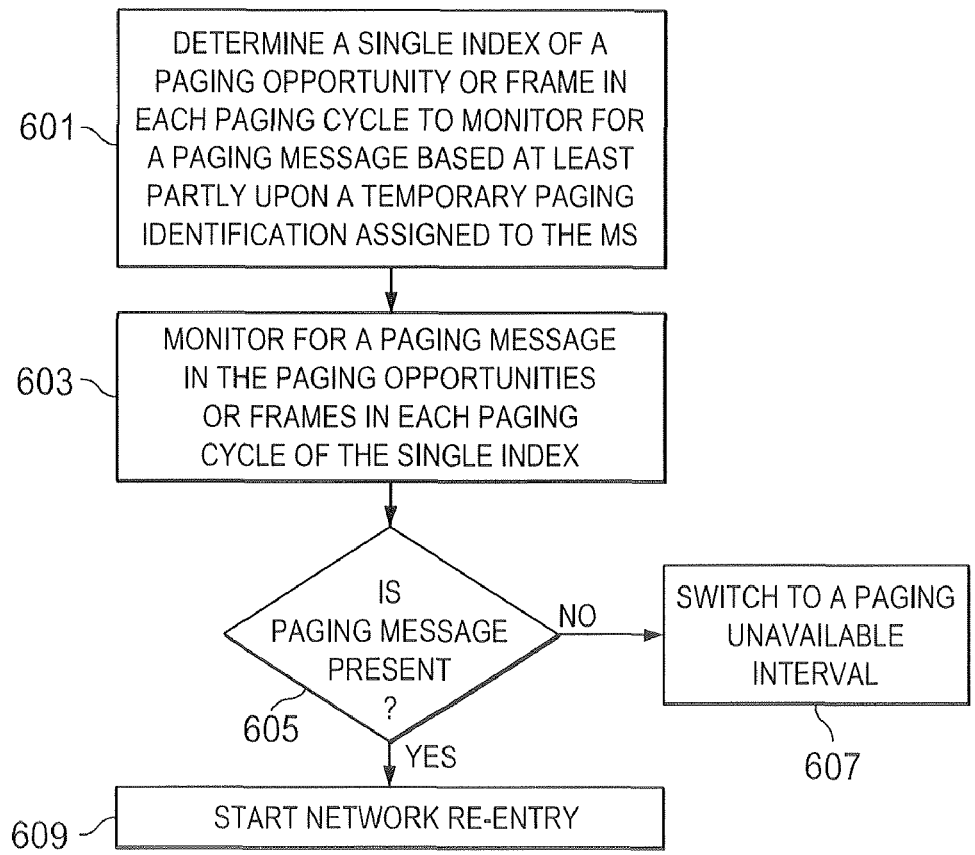
FIG. 6 is a flow chart illustrating a method of monitoring paging messages according to one embodiment of the present disclosure.

FIG. 6 is a flow chart illustrating a method of monitoring paging messages according to one embodiment of the present disclosure.

As described earlier, if there is a MOB_PAG-ADV( ) to be transmitted during a paging cycle, the BS sends the MOB_PAG-ADV( ) in the frame number equal to Temporary_ID % N in the paging cycle. The MS determines a single index of a paging opportunity or frame in each paging cycle to monitor for a paging message (Block 601). The index is based at least partly upon a temporary paging identification assigned to the MS. Therefore, at the beginning of each paging cycle, an MS automatically knows at which frame to look for the MOB_PAG-ADV( ) of interest because the MS only has to monitor for the paging message transmitted in the index n of the paging opportunities or frames in each paging cycle, where n=MS Temporary_ID % N (Block 603).

If the MS determines that the MS is not paged (Block 605), the MS switches to a paging unavailable interval (Block 607). If the MS determines that the MS is paged (Block 605), the MS starts network re-entry (Block 609).

Accordingly, the MS only has to stay in a paging listening window for K subframes in each paging cycle. This embodiment significantly reduces the probability of transferring a large paging message because of the distribution of the paging message. This embodiment results in significant power saving for an MS in idle mode and does not affect the location update procedure.

Figure 7:
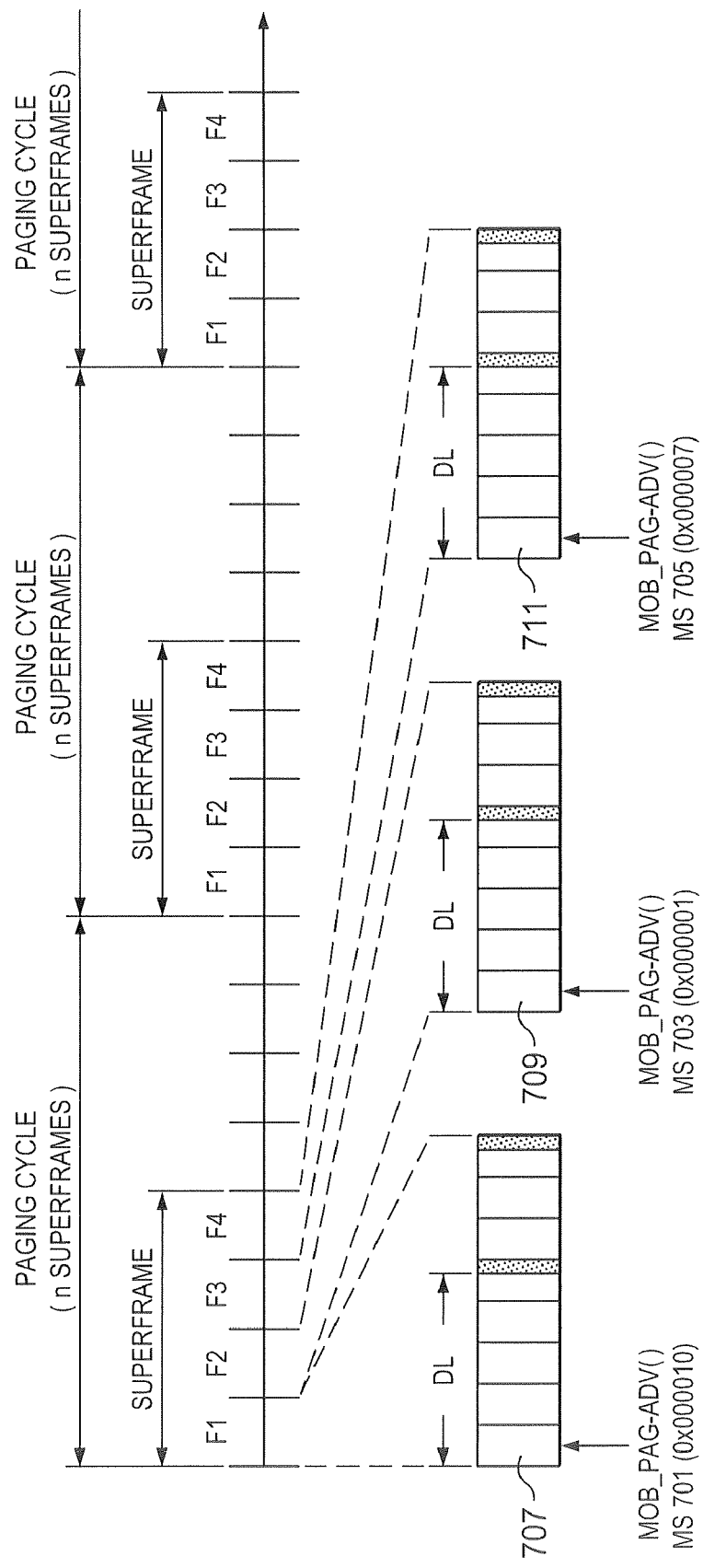
FIG. 7 illustrates the distribution of a paging message in a paging cycle according to one embodiment of the present disclosure.

FIG. 7 illustrates the distribution of a paging message in a paging cycle according to one embodiment of the present disclosure.

In this example, the MOB_PAG-ADV( ) broadcast interval is shown as consisting of one superframe or 4 frames. The MS 701 is shown as having a Temporary_ID of 0x000010 (i.e., 16). If MS 701 is paged in the next paging cycle, the MOB_PAG-ADV( ) including this Temporary_ID of MS 701 is sent in the first subframe 707 of frame 1 because 0x000010%4=0. The frame corresponds to the number resulting from the Temporary_ID % 4 operation, where Temporary_ID is the temporary paging ID assigned to this MS.

In this example, the temporary_IDs of MS 703 and MS 705 are 0x000001 and 0x000007, respectively. Therefore, the paging messages for MS 703 and MS 705, if the paging messages exist, are sent in the first subframes 709 and 711 and of frames 2 and 4, respectively.

Figure 8:
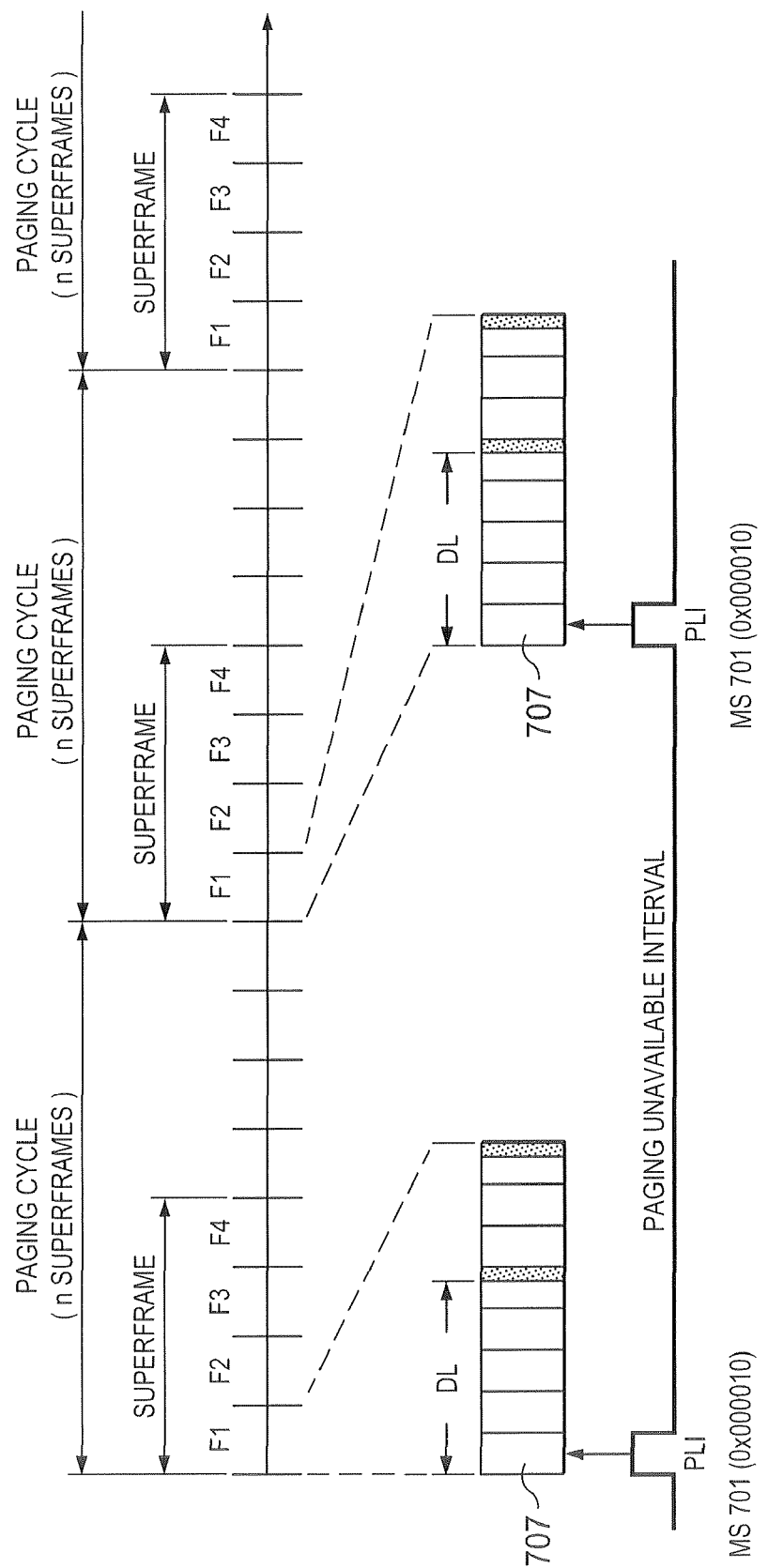
FIG. 8 illustrates the paging listening interval of a mobile station during a paging cycle according to one embodiment of the present disclosure.

According to the present disclosure, an MS automatically knows which subframe to look for the MOB_PAG-ADV( ) of interest in each paging cycle. If the MS is not paged, the MS switches to a paging unavailable interval. If it is paged, the MS starts network re-entry. In this example, as shown in FIG. 8, MS 701 only has to stay in PLI for one subframe 707 in each paging cycle.

Furthermore, without explicit signaling, each MS automatically knows which frame (more specifically, which subframes) to monitor to determine if the MS is paged during each paging cycle. Therefore, there is no need for a paging indicator, a paging location indicator, or a last paging indicator. As illustrated in FIG. 8, an MS only has to stay awake for several subframes in each paging cycle, which results in effective power saving.

Within a cell, the BS pages MSs in several paging opportunities that are equally distanced. Roughly the same number of MSs is paged in each paging opportunity. This also naturally distributes the MSs for UL access after the MSs are paged and reduces or avoids the congestion in UL access.

Even though the present disclosure illustrates the paging opportunity using superframe, frame and subframe, this invention is not limited to the scale of the paging opportunity. For example, the paging opportunities in FIGS. 7 and 8 could be distanced in a number of superframes if desirable, especially when considering the allocation and distribution of UL access opportunities.

If an MS cannot decode a paging message, the MS could go back to an idle state, and the BS would try to page the MS again in the next paging cycle. Of course, other failure recovery mechanisms could be used. In any case, there is no loss of synchronization between the BS and the MS.

Moreover, a MS moving back and forth between two paging areas may be assigned a temporary paging ID for each paging area so that there is no need for a location update. Ideally, these two temporary paging IDs are created such a way that the MS can monitor both temporary paging IDs at one paging opportunity. To that end, these two temporary paging IDs modulo N should equal to the same value. In some embodiments, the same temporary paging ID may be used for both paging areas so that the MS does not have to monitor two subframes in each paging cycle, which allows the MS to save power.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication network comprising a plurality of paging controllers capable of communication with a plurality of base stations within a coverage area of the network, wherein at least one of the plurality of paging controllers is configured to:
    if a mobile station within a paging area requests to enter idle mode, assign a temporary paging identification to the mobile station; and
    transmit the temporary paging identification to a base station in communication with the mobile station,
    wherein the temporary paging identification is used by the base station to determine an index that identifies a paging opportunity or frame in a paging cycle to be used for transmitting a paging message for the mobile station, wherein the identified paging opportunity or frame comprises a subset of the paging cycle.

2. The network of claim 1, wherein the index of the paging opportunity or frame is determined by the following equation:

index=temporary paging identification % N, wherein % denotes a modulo operation, and N denotes a number of paging opportunities or frames in a paging cycle.

3. The network of claim 1, when a next mobile station in the paging area requests to enter idle mode, a new temporary paging identification is generated by incrementing the temporary paging identification by one.

4. The network of claim 1, wherein when the mobile station leaves the paging area, the paging controller is configured to recover the temporary paging identification of that mobile station and re-assign the temporary paging identification to a next mobile station in the paging area requesting to enter idle mode.

5. The network of claim 1, wherein the temporary paging identification comprises one of 00, 01, 10, and 11 in the last two bits and randomly selected values for the higher bits.

6. The network of claim 5, wherein when the mobile station leaves the paging area, the paging controller is configured to recover the last two bits of the temporary paging identification of that mobile station and use the last two bits to generate a new temporary paging identification for a next mobile station in the paging area requesting to enter idle mode.

7. The network of claim 1, wherein the mobile station is assigned to one or more paging subgroups based at least partly upon the temporary paging identification.

8. The network of claim 7, wherein each paging subgroup has almost the same number of mobile stations in idle mode.

9. The network of claim 7, wherein the mobile station is assigned to a paging subgroup using the following relationship:

paging subgroup index=temporary paging identification % n, wherein % denotes a modulo operation, and n denotes the total number of paging subgroups.

10. A paging controller capable of wireless communication with a plurality of base stations within a coverage area of a network, wherein the paging controller is configured to:
    if a mobile station within a paging area requests to enter idle mode, assign a temporary paging identification to the mobile station; and
    transmit the temporary paging identification to a base station in communication with the mobile station,
    wherein the temporary paging identification is used by the base station to determine an index that identifies a paging opportunity or frame in a paging cycle to be used for transmitting a paging message for the mobile station, wherein the identified paging opportunity or frame comprises a subset of the paging cycle.

11. The paging controller of claim 10, wherein the index of the paging opportunity or frame is determined by the following equation:

index=temporary paging identification % N, wherein % denotes a modulo operation, and N denotes a number of paging opportunities or frames in a paging cycle.

12. The paging controller of claim 10, when a next mobile station in the paging area requests to enter idle mode, a new temporary paging identification is generated by incrementing the temporary paging identification by one.

13. The paging controller of claim 10, wherein when the mobile station leaves the paging area, the paging controller is configured to recover the temporary paging identification of that mobile station and re-assign the temporary paging identification to a next mobile station in the paging area requesting to enter idle mode.

14. The paging controller of claim 10, wherein the temporary paging identification comprises one of 00, 01, 10, and 11 in the last two bits and randomly selected values for the higher bits.

15. The paging controller of claim 14, wherein when the mobile station leaves the paging area, the paging controller is configured to recover the last two bits of the temporary paging identification of that mobile station and use the last two bits to generate a new temporary paging identification for a next mobile station in the paging area requesting to enter idle mode.

16. The paging controller of claim 10, wherein the mobile station is assigned to one or more paging subgroups based at least partly upon the temporary paging identification.

17. The paging controller of claim 16, wherein each paging subgroup has almost the same number of mobile stations in idle mode.

18. The paging controller of claim 16, wherein the mobile station is assigned to a paging subgroup using the following relationship:

paging subgroup index=temporary paging identification % n, wherein % denotes a modulo operation, and n denotes the total number of paging subgroups.

19. A method of operating a paging controller, the method comprising:
if a mobile station within a paging area requests to enter idle mode, assigning a temporary paging identification to the mobile station; and
transmitting the temporary paging identification to a base station in communication with the mobile station,
wherein the temporary paging identification is used by the base station to determine an index that identifies a paging opportunity or frame in a paging cycle to be used for transmitting a paging message for the mobile station, wherein the identified paging opportunity or frame comprises a subset of the paging cycle.

20. The method of claim 19, wherein the index of the paging opportunity or frame is determined by the following equation:

index=temporary paging identification % N, wherein % denotes a modulo operation, and N denotes a number of paging opportunities or frames in a paging cycle.

21. The method of claim 19, further comprising:
when a next mobile station in the paging area requests to enter idle mode, generating a new temporary paging identification by incrementing the temporary paging identification by one.

22. The method of claim 19, further comprising:
when the mobile station leaves the paging area, recovering the temporary paging identification of that mobile station and re-assigning the temporary paging identification to a next mobile station in the paging area requesting to enter idle mode.

23. The method of claim 19, wherein the temporary paging identification comprises one of 00, 01, 10, and 11 in the last two bits and randomly selected values for the higher bits.

24. The method of claim 23, further comprising:
when the mobile station leaves the paging area, recovering the last two bits of the temporary paging identification of that mobile station and using the last two bits to generate a new temporary paging identification for a next mobile station in the paging area requesting to enter idle mode.

25. The method of claim 19, wherein the mobile station is assigned to one or more paging subgroups based at least partly upon the temporary paging identification.

26. The method of claim 25, wherein each paging subgroup has almost the same number of mobile stations in idle mode.

27. The method of claim 25, wherein the mobile station is assigned to a paging subgroup using the following relationship:

paging subgroup index=temporary paging identification % n, wherein % denotes a modulo operation, and n denotes the total number of paging subgroups.

28. A wireless communication network comprising a plurality of base stations capable of wireless communication with a plurality of subscriber stations within a coverage area of the network, wherein at least one of the plurality of base stations is configured to:
receive a temporary paging identification from a paging controller, the temporary paging identification being associated with a mobile station requesting to enter idle mode; and
determine an index that identifies a paging opportunity or frame in a paging cycle to be used for transmitting a paging message for a mobile station using the temporary paging identification, wherein the identified paging opportunity or frame comprises a subset of the paging cycle.

29. The network of claim 28, wherein the at least one of the plurality of base stations is further configured to transmit the paging message for the mobile station in the paging opportunity or frame in the paging cycle.

30. The network of claim 28, wherein the index of the paging opportunity or frame is determined by the following equation:

index=temporary paging identification % N, wherein % denotes a modulo operation, and N denotes a number of paging opportunities or frames in a paging cycle.

31. A base station capable of wireless communication with a plurality of subscriber stations within a coverage area of a network, wherein the base station is configured to:
receive a temporary paging identification from a paging controller, the temporary paging identification being associated with a mobile station requesting to enter idle mode; and
determine an index that identifies a paging opportunity or frame in a paging cycle to be used for transmitting a paging message for a mobile station using the temporary paging identification, wherein the identified paging opportunity or frame comprises a subset of the paging cycle.

32. The base station of claim 31, wherein the base station is further configured to transmit the paging message for the mobile station in the paging opportunity or frame in the paging cycle.

33. The base station of claim 31, wherein the index of the paging opportunity or frame is determined by the following equation:

index=temporary paging identification % N, wherein % denotes a modulo operation, and N denotes a number of paging opportunities or frames in a paging cycle.

34. A method of operating a base station, the method comprising:
receiving a temporary paging identification from a paging controller, the temporary paging identification being associated with a mobile station requesting to enter idle mode; and
determining an index that identifies a paging opportunity or frame in a paging cycle to be used for transmitting a paging message for a mobile station using the temporary paging identification, wherein the identified paging opportunity or frame comprises a subset of the paging cycle.

35. The method of claim 34, further comprising:
transmitting the paging message for the mobile station in the paging opportunity or frame in the paging cycle.

36. The method of claim 34, wherein the index of the paging opportunity or frame is determined by the following equation:

$$\text{index} = \text{temporary paging identification} \% N,$$

wherein % denotes a modulo operation, and N denotes a number of paging opportunities or frames in a paging cycle.

37. A mobile station configured to:

determine a single index that identifies a paging opportunity or a single index of a frame in each paging cycle to monitor for a paging message, wherein the paging opportunity or frame identified by the index comprises a subset of the paging cycle and the index is determined based at least partly upon a temporary paging identification assigned to the mobile station by a paging controller and received from the base station; and monitor for the paging message only in the paging opportunity or frame of the single index.

38. The mobile station of claim 37, wherein the single index of the paging opportunity or frame is determined by the following equation:

$$\text{index} = \text{temporary paging identification} \% N,$$

wherein % denotes a modulo operation, and N denotes a number of paging opportunities or frames in a paging cycle.

39. The mobile station of claim 37, wherein the mobile station is configured to remain in a paging listening interval for only one paging opportunity or subframe in each paging cycle.

40. The mobile station of claim 37, wherein if the mobile station does not receive a paging message in the paging opportunity or frame of the single index, the mobile station is configured to switch to a paging unavailable interval.

41. The mobile station of claim 37, wherein if the mobile station does receive a paging message in the paging opportunity or frame of the single index, the mobile station is configured to start network re-entry.

42. The mobile station of claim 37, wherein the mobile station is configured to determine the single index in an absence of explicit signaling.

43. The mobile station of claim 37, wherein the mobile station is configured to determine the single index in an absence of a paging indicator, a paging location indicator, or a last paging indicator.

* * * * *